US012068146B2

(12) United States Patent
Sultana et al.

(10) Patent No.: US 12,068,146 B2
(45) Date of Patent: Aug. 20, 2024

(54) ANALYTIC NEBULISER

(71) Applicant: GLASS EXPANSION PTY. LIMITED, Port Melbourne (AU)

(72) Inventors: David Sultana, Port Melbourne (AU); Anthony Le Breton, Melbourne (AU)

(73) Assignee: Glass Expansion Pty. Limited, Port Melbourne (AU)

( * ) Notice: Subject to any disclaimer, the term of this patent is extended or adjusted under 35 U.S.C. 154(b) by 396 days.

(21) Appl. No.: 17/428,068

(22) PCT Filed: Feb. 4, 2020

(86) PCT No.: PCT/AU2020/050078
§ 371 (c)(1),
(2) Date: Aug. 3, 2021

(87) PCT Pub. No.: WO2020/160604
PCT Pub. Date: Aug. 13, 2020

(65) Prior Publication Data

US 2022/0148870 A1 May 12, 2022

(30) Foreign Application Priority Data

Feb. 4, 2019 (AU) ................................ 2019900333

(51) Int. Cl.
*H01J 49/04* (2006.01)
*B05B 7/06* (2006.01)
(Continued)

(52) U.S. Cl.
CPC ............ *H01J 49/045* (2013.01); *B05B 7/066* (2013.01); *B05B 7/0815* (2013.01); *B05B 7/0861* (2013.01); *B05B 15/65* (2018.02)

(58) Field of Classification Search
CPC ..... H01J 49/045; H01J 49/0445; B05B 15/65; B05B 15/066; B05B 7/066; B05B 7/0815
See application file for complete search history.

(56) References Cited

U.S. PATENT DOCUMENTS 5,868,322 A * 2/1999 Loucks, Jr. ............. B05B 7/066 73/864.81
8,963,076 B2 2/2015 Jong
2017/0338092 A1* 11/2017 Stephan ................ H01J 49/107

FOREIGN PATENT DOCUMENTS

WO WO 1993/007465 A1 4/1993
WO WO-9307465 A1 * 4/1993 ............. B05B 5/002
(Continued)

OTHER PUBLICATIONS

PCT International Search Report for PCT/AU2020/050078 dated Apr. 3, 2020.
PCT Written Opinion for PCT/AU2020/050078 dated Apr. 3, 2020.

*Primary Examiner* — David E Smith
(74) *Attorney, Agent, or Firm* — KNOBBE, MARTENS, OLSON & BEAR, LLP

(57) ABSTRACT

The invention provides an analytic nebuliser device for delivering a sample in aerosolised form, the device comprising a nebuliser nozzle configured to receive a flow of said sample and generate a plume of aerosolised sample spray and a chamber configured to receive a flow of make-up gas and connecting with a plurality of microchannels having outlets arranged around and adjacent to said nebuliser nozzle wherein the microchannels are configured to produce a make-up gas stream with high linear velocity around said aerosolised sample spray to shape and direct said plume. The invention extends to a mass spectrometry or spectroscopy system including the above analytic nebuliser device, to provide in operation the aerosolised sample spray to an ionisation device of the system.

14 Claims, 6 Drawing Sheets

(51) Int. Cl.

| | |
|---|---|
| ***B05B 7/08*** | (2006.01) |
| ***B05B 15/65*** | (2018.01) |

(56) References Cited

FOREIGN PATENT DOCUMENTS

| | | | |
|---|---|---|---|
| WO | WO 98/29896 | A1 | 7/1998 |
| WO | WO 2017/201143 | A1 | 11/2017 |
| WO | WO 2018/207606 | A1 | 11/2018 |

* cited by examiner

ANALYTIC NEBULISER

FIELD OF THE INVENTION

The present invention relates to a sample introduction device, such as an analytic nebuliser, a plasma torch injector or a laser ablation transfer tube for use in Inductively Coupled Plasma (ICP) analytical systems for performing mass spectrometry (MS) or optical emission spectroscopy (OES).

BACKGROUND OF THE INVENTION

Analytical atomic spectrometry has become an important tool in trace element analysis. Various approaches have been developed for analysing particles that range in size from around 10 nm to 10 μm in diameter, which may consist of salts, soot, crustal matter, metals, organic molecules and biological materials (or mixtures thereof). A wide variety of ionisation sources have been developed to use with the various types of particles, including electron impact, laser ionisation, laser desorption, chemical ionisation, and electron capture ionisation. Different ICP-OES and ICP-MS instruments have been designed to ionise and analyse particular classes of compounds (e.g. salts or organics). Some instruments are capable of single particle analysis, while others require the collection of multiple particles to obtain sufficient sample. These techniques are used in areas of pharmaceutical and medical research, biological, environmental and agricultural assessment, petrochemical testing and nuclear applications.

In such instruments, a sample introduction device including a nebuliser (or similar injector) in which a pressurised gas flow (such as argon gas) is used to produce an aerosol form of the sample and to direct it into the analytical plasma or other ionisation device of an atomic spectrometer. Typically, the nebuliser is coupled to the ionisation device of the spectrometer by way of a spray chamber with an inlet end which surrounds the aerosol plume of the nebuliser and receives the sample and an outlet end directed to the analytical plasma. The spray chamber includes a drain to collect oversized aerosol droplets, which cannot be efficiently utilised by the analytical plasma.

The fine droplets in the aerosol spray containing the fine sample particles are vaporised and ionised in the analytical plasma, and analysis performed by connecting the plasma torch to the OES or MS device.

In pneumatic analytical nebulisers, the suction produced at the nebuliser nozzle is typically utilised to draw the sample liquid into the gas jet, which process breaks the liquid into small droplets to be entrained in the gas flow.

A variety of different nebuliser systems are known, these include: concentric designs (in which the liquid flow is surrounded by a gas flow, or vice versa); cross flow designs (with the gas flow at right angles to the liquid flow); entrained flow designs (in which the gas and liquid are mixed in the system and emitted as a combined flow); V-groove designs (Babington form, in which liquid is spread over a surface to decrease the surface tension and passed over a gas orifice); parallel path designs (in which liquid is delivered to a point adjacent a gas orifice and the liquid is drawn into the gas stream); and vibrating mesh designs (in which liquid is pushed through micro orifices by means of a vibrating ultrasonic plate).

Successful operation of such instruments relies on the fluid coupling between the nebuliser and the ionisation device of the spectrometer, as the sample transport efficiency is critical to performance. A suboptimal design of spray chamber can result in a poor signal and/or the waste of a large portion of the sample introduced. Further, when used for analysis of live cells, it is important not to damage the cell structure during the nebulising process or the sample transport. To this end, it is known to introduce an additional gas flow (known as 'make-up gas') in an outer tangential path in a spray chamber, to generate a laminar flow within the inner surface of the chamber in order to reduce droplet deposition on that inner surface. An example of such a device is described in U.S. Pat. No. 10,147,592, in which the spray chamber is provided with a dual concentric sleeve arrangement, the inner tube being positioned adjacent to the tip of the nebuliser and the outer sleeve comprising the upstream part of the spray chamber. The make-up gas is introduced through two tangentially-arranged side inlets to the narrow annular space between the two sleeves, which has the effect of providing a swirling outer gas stream to shield the inner surface of the spray chamber from droplet deposition. One or more small apertures are provided in the inner sleeve to prevent back flow of droplets.

The concentric twin-tube design discussed above may afford benefits in providing the desired sheathing gas flow around the aerosol sample spray, but is generally not able to maintain appropriate flow velocity for efficient and effective sheathing of the aerosol at the required gas flow (typically around 0.5 L/min.). Further, its reliance on a very narrow annular spacing between the sleeves can create manufacturing challenges.

The present invention seeks to address at least in part one or more disadvantages of the prior art, or to provide an alternative approach.

Reference to any prior art in the specification is not an acknowledgment or suggestion that this prior art forms part of the common general knowledge in any jurisdiction or that this prior art could reasonably be expected to be combined with any other prior art by a person skilled in the art.

SUMMARY OF THE INVENTION

In one aspect, the present invention provides an analytic nebuliser device for delivering a sample in aerosolised form, the device comprising:

- a nebuliser nozzle configured to receive a flow of said sample and generate a plume of aerosolised sample spray; and
- a chamber configured to receive a flow of make-up gas and connecting with a plurality of microchannels having outlets arranged around and adjacent to said nebuliser nozzle;
- wherein the microchannels are configured to produce a make-up gas stream with high linear velocity around said aerosolised sample spray to shape and direct said plume.

In this specification and claims, 'high linear velocity' signifies a velocity sufficiently high to allow use with substantially greater sample flow before signs of droplets depositing on chamber wall than would otherwise be possible.

Typically an analytic nebuliser is used with a liquid sample, however it will be understood that the term as used herein embraces all types of devices able to generate sample aerosol plumes, including plasma torch injectors and laser ablation devices able to produce a vaporised stream of sample particles.

The chamber and microchannels are preferably arranged and connected such that the make-up gas stream is controllable separately to any other gas flow applied to the device, and in particular any nebulising gas flow.

The outlets of the microchannels thus provide a peripheral array of gas jets encircling the nebulising nozzle, these gas jets combining to provide a high linear velocity laminar sheathing gas flow for the aerosolised sample spray. Adjustment of the gas flow through the microchannels can provide the ability to shape the plume of aerosolised sample spray and increase transport efficiency. As will be understood, it is significantly easier to accurately machine and arrange the microchannels of the device of the invention than to fabricate and correctly position the concentric sleeves of the device of U.S. Pat. No. 10,147,592.

For example, when the analytic nebuliser device is used with a spray chamber as a conduit (for passing a sample spray to another apparatus such as an ionisation device in an ICP system), the invention can be used to shape the plume of aerosolised sample spray to ensure that contact with the inner walls of the spray chamber is minimised or avoided, so reducing or avoiding deposition of sample droplets on the inner walls of the spray chamber.

Further, selectively increasing the velocity of the gas jets can be used to increase the overall velocity of the plume which can have the effect of ensuring effective penetration of the ionisation source (eg. the analytical plasma) and enhancing transport efficiency of the sample spray. Moreover, the device of the invention can be used to assist in controlling droplet size, by preventing agglomeration of droplets in the aerosolised spray, and/or by using the shear forces of the sheathing gas flow to break down droplets in the aerosolised spray and reduce droplet size.

As will be understood, the invention can thus be regarded as a device affording shaping of an aerosolised sample plume. Potentially then, in an ICP system, this allows the omission of spray chamber between the nebuliser and the ionisation device, ie. the sample can be sprayed directly into the plasma torch.

In a preferred form, the nozzle has a central axis and the microchannels are configured to direct said make-up gas stream substantially parallel to said central axis. In alternative forms the microchannels are angled relative to said central axis. Certain orientations can be used to increase the swirl of the make-up gas. Alternatively or additionally, directing the microchannels into the plume can be used to increase mixing of the aerosol with the make-up gas.

Preferably, the outlets of the microchannels are in a plane close to that of the nebuliser nozzle outlet. Preferably, this within ±5 mm (in the axial direction) of the termination of the nozzle outlet.

The device may include between 3 and 10 microchannels, preferably 6 microchannels.

Preferably, the microchannels are evenly angularly spaced around the nebuliser nozzle and equidistant from said central axis. The distance from the central axis is preferably in the range 2-12 mm.

The outlets of the microchannels may take any suitable size, and in one embodiment are in the range 0.02 to 0.05 mm, such as around 0.03 mm. In other embodiments the outlets may have a diameter up to 0.5 mm.

In one form, the device includes an adaptor, the adaptor providing said chamber and said microchannels and further including an inlet connectable with a source of make-up gas, the adaptor configured to attach around a nebuliser body and position the outlets of said microchannels around and adjacent to said nebuliser nozzle.

The adaptor preferably has an outer portion configured to support and engage with a spray chamber.

In an alternative form, the nebuliser nozzle forms part of a nebuliser, and said chamber and said microchannels are integrated into the nebuliser.

In a further form, the present invention provides a mass spectrometry or spectroscopy system including an analytic nebuliser device as defined above, to provide in operation the aerosolised sample spray to an ionisation device of the system. In one form, the system does not have a spray chamber arranged between the analytic nebuliser device and the ionisation device.

BRIEF DESCRIPTION OF THE DRAWINGS

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

Single cell analysis ICP-MS (SC-ICP-MS) is a rapidly growing technique used in life science research which can enhance understandings in cellular biology, oncology and drug discovery. Single-Cell ICP-MS enables the intra-cellular quantitation of metals in individual cells and is used in the study of disease aetiology and in the development of new treatments.

The present invention can be used in an SC-ICP-MS system, or in any system that involves delivery of a sample by way of a nebulised spray to an ionisation device, such as a plasma torch for analytical atomic spectroscopy.

Figure 1:
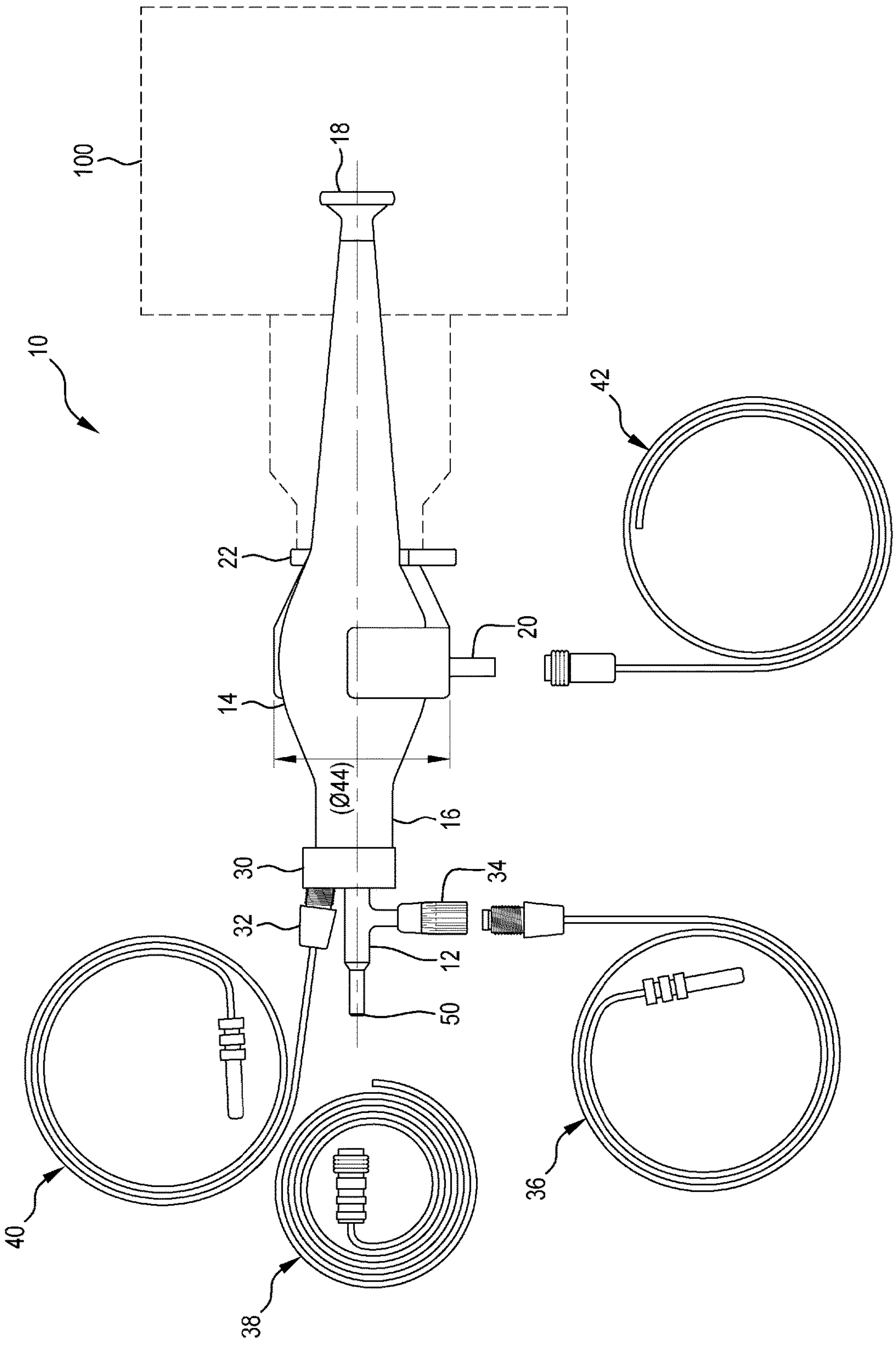
FIG. 1 shows a sample transferring device in accordance with an embodiment of the present invention.

In FIG. 1, a sample transferring assembly 10 comprises a pneumatic nebuliser assembly 12 and a shaped spray chamber 14. Spray chamber 14 provides a conduit for passing a sample spray from an inlet end 16 to an outlet end 18, and is supported by a chamber mount 22 for secure connection to a mass spectrometer, illustrated figuratively by reference 100. Spray chamber 14 includes a drain outlet 20 positioned at its lowest point, for removal of liquid droplets deposited on the inner walls of the chamber.

Nebuliser assembly 12, shown in FIG. 2 and described in further detail below, includes a nebuliser adaptor 30 that sealingly connects into spray chamber inlet end 16. The nebuliser of assembly 12 includes a liquid sample inlet 50 at its upstream end, a nebulising gas inlet with a screw type quick connector 34 and a spray nozzle 52 at its downstream end, the spray nozzle designed to produce a cone-shaped aerosol spray into spray chamber 14. The constructional details of such a nebuliser are well known, and will not be further described here.

FIG. 1 also shows a spray chamber drain line 42 comprising capillary tubing with a push connection for coupling to drain outlet 20, a nebulising gas line 36 having a quick connect screw connection for coupling to fluid inlet 34, a sample supply line 38 with a push connection for connection to sample inlet 50 and a make-up gas line 40 with an outlet screw connector 32, discussed further below.

Figure 2:
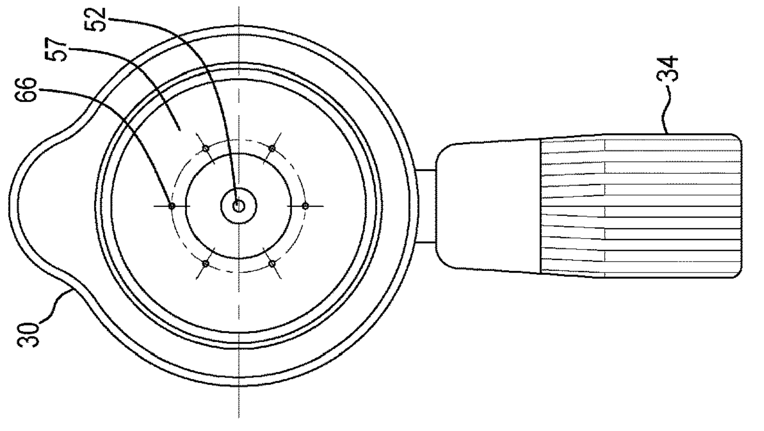
FIG. 2 is a side view of a nebuliser assembly of the sample transferring device of FIG. 1.

As illustrated in FIG. 2, nebuliser adaptor 30 has a generally tubular shape and features a through bore sized to accommodate the outer tube 54 of the nebuliser, and further includes a downstream narrowed cylindrical portion 56 terminating in a transverse downstream face 57. This narrowed cylindrical portion 56 has an annular outer groove towards its downstream end carrying an O-ring 58, sized to sealingly fit within inlet end 16 of spray chamber 14. As shown, the narrowed portion 56 of adaptor 30 is concentric with nebuliser tube 54. In the upstream end of adaptor 30 a threaded bore 60 is provided, connecting with a make-up gas passage 62. Bore 60 and passage 62 are inclined to the axis of nebuliser tube 54, and the downstream end of passage 62 connects to an annular chamber 64 within narrowed portion 56 of assembly 30, close to the downstream end. Six small bores 66, parallel to the nebuliser centreline and of equal angular separation around nozzle 52, connect chamber 64 through face 57. When make-up gas line 40 is connected to adaptor 30 (by engagement of screw connector 32 with threaded bore 60) the bores 66 provide a plurality of gas microjets around nebuliser nozzle 52 by which make-up gas flow 41 exits adaptor 30.

In an embodiment tested by the inventors, bores 66 with a diameter of 300 μm were used, at a radius of 3.5 mm from the nebuliser nozzle axis. As will be understood, for different applications, different dimensions may be suitable.

As the skilled reader will appreciate, the nebuliser and the nebuliser spray chamber 14 are typically made of glass. However other materials are possible, in particular suitable polymer materials such as PEEK.

In use, nebuliser assembly 12 is connected into spray chamber 14, which is mounted to mass spectrometer 100 by way of chamber mount 22. Nebulising gas line 36 is connected to the nebuliser by way of gas inlet connector 34, sample supply line 38 is connected to nebuliser sample inlet end 50, make-up gas line 40 is connected to adaptor assembly 30 by way of connector 32 and drain line is connected to spray chamber drain outlet 20.

The make-up gas supplied by microjet bores 66 around aerosol nozzle 52 can serve a number of functions. Firstly, the make-up gas can be used to increase the gas output of the sample transfer system. Further or alternatively, the stream of gas may be provided at a higher velocity than the nebuliser plume in order to ensure that the sample aerosol effectively penetrates the outer skin of the analytical plasma.

Further or alternatively, and like the prior art device described in U.S. Pat. No. 10,147,592, the gas exiting microjet bores 66 can be used to form an annular sheath to shield the inside surfaces of spray chamber 14 to prevent or reduce deposition of sample aerosol on the inner walls, so improving transport efficiency of the system.

In particular, as noted above, the make-up gas exiting microjet bores 66 can be used to produce a high linear velocity, laminar flow gas surrounding the nebuliser aerosol plume. In accordance with the present invention, this can be used to alter the shape or to constrain the nebuliser sample plume to better suit the geometry of the chamber, injector or torch. If properly applied, this sheath of annular make-up gas can be used to fully constrain the sample aerosol all the way from the nebuliser nozzle to the ionisation device, this aerosol plume shaping potentially meaning that spray chamber 14 may not be required, allowing spraying of the aerosol directly into the plasma torch.

Further or alternatively the device of the invention can be used to rapidly and efficiently chemically modify the aerosolised sample, by using a selected reactive gas such as oxygen, chlorine or ammonia as the make-up gas.

Moreover, as noted above, the make-up gas exiting microjet bores 66 can be used to provide a high linear velocity shear gas that improves nebulisation efficiency by preventing droplet agglomeration and impacting droplets in the aerosol plume in order to produce an aerosol with a smaller droplet size distribution, which can significantly assist in improving transport efficiency of the system.

A significant advantage of the invention is that it is a relatively simple matter to machine the bores 66 with great precision, hence affording accurate positioning of the peripheral ring of microjets and hence allowing accurate control of the sheathing gas and hence shaping of the aerosol plume. The more accurate control means that a lower flow of make-up gas can be used when compared with prior solutions, thus increasing nebulisation efficiency.

Figure 4:
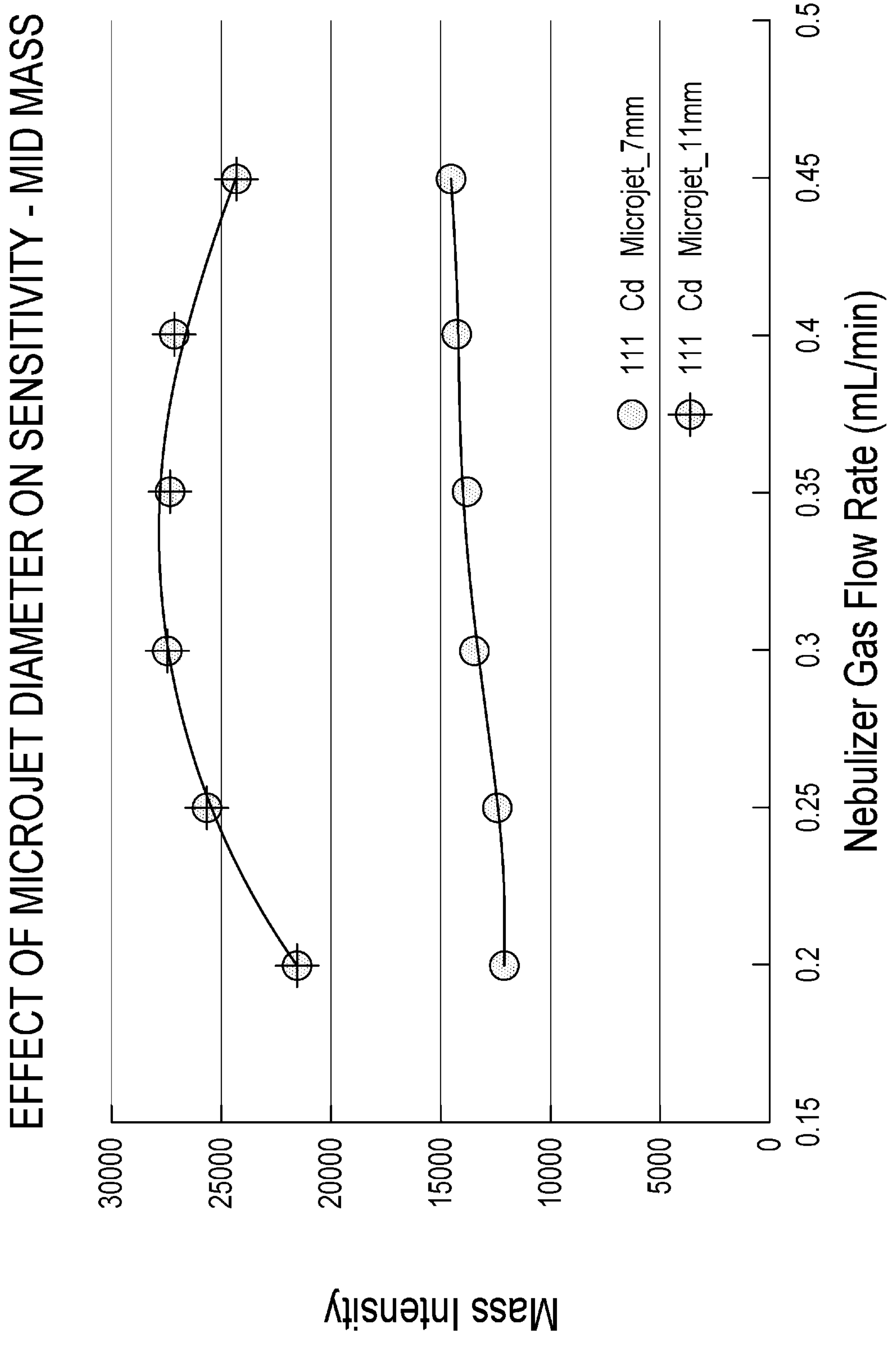
FIG. 4 illustrates the effect of the separation of nebuliser assembly microchannel outlets on transport efficiency.

From tests conducted by the inventors, and as FIG. 4 illustrates, the radial separation of the microjets from the nebuliser nozzle axis can dramatically affect the transport efficiency of the aerosol to the ionisation device. The two curves show how the sensitivity of a mid-mass element significantly decreases when the radius of the outlet of bores 66 from the nebuliser nozzle axis is increased from 3.5 mm ("Cd Microjet_7 mm") to 5.5 mm ("Cd Microjet_11 mm").

Figure 5:
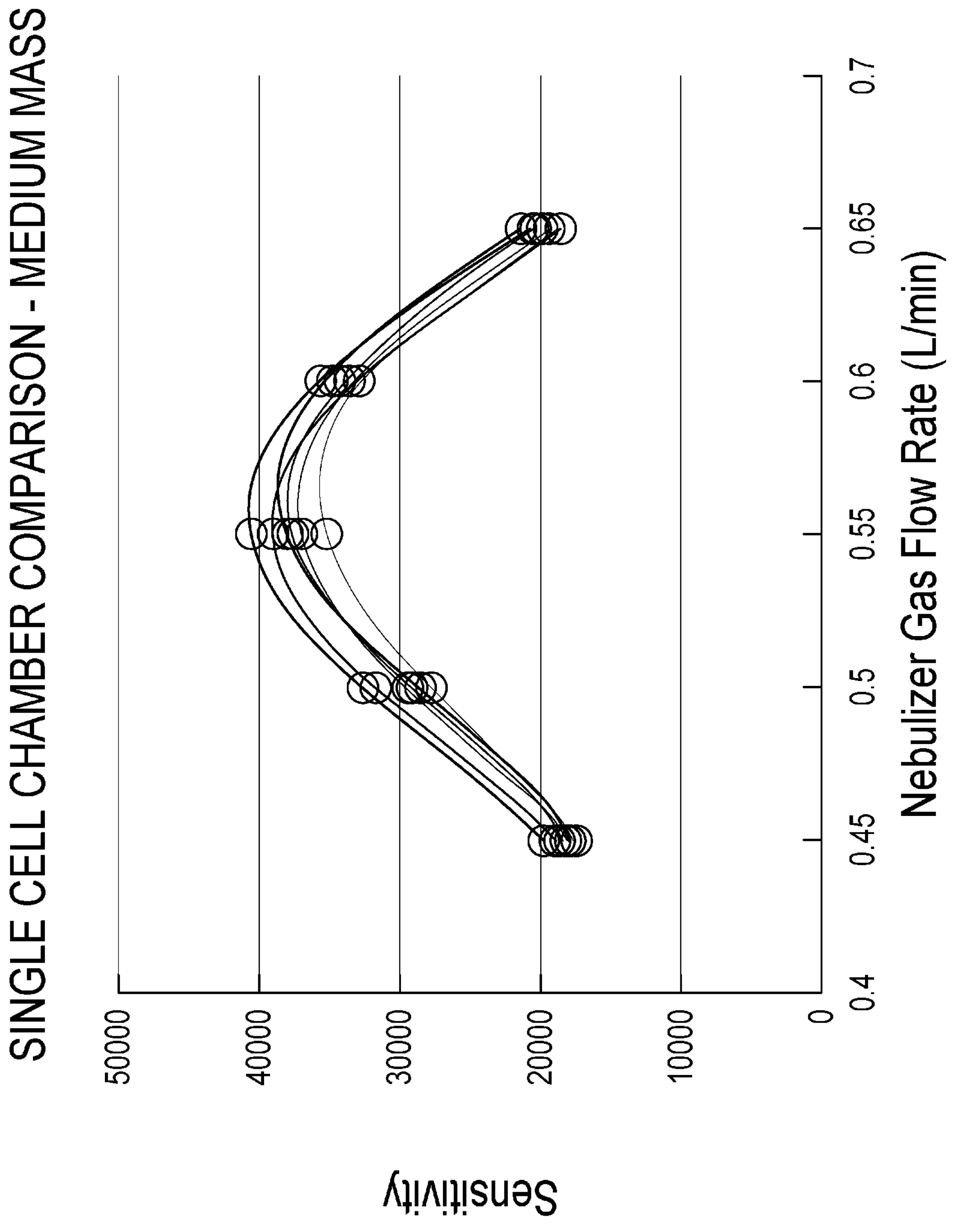
FIG. 5 illustrates the reproducibility of results between different samples of nebuliser assembly tested.

The 6 curves in FIG. 5 illustrate the consistency of transport efficiency for six different systems tested. The reproducibility between the results of different tests arises from the ease and precision possible with the manufacture of the device of the invention.

Figure 6:
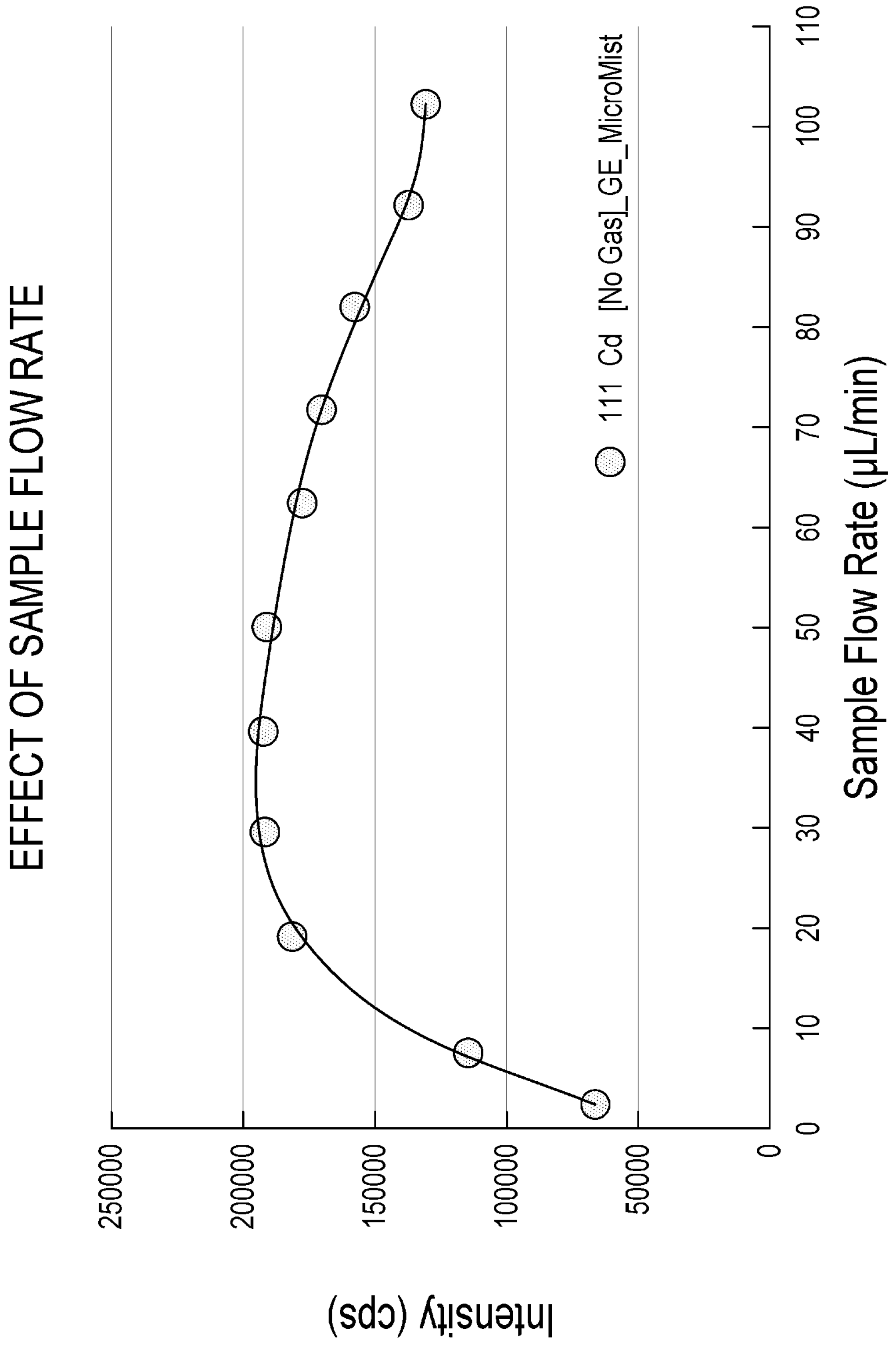
FIG. 6 illustrates the effect of sample flow rate on transport efficiency.

Similarly, the test results of FIG. 6 show the consistency of performance of the device of the invention across a range of sample uptake rates (sample flow rate in μL/min against signal intensity in counts-per-second, cps).

As noted above, the embodiment tested by the inventors used microchannel bores 66 with a diameter of 300 μm. As will be understood, for different applications, different bore dimensions may be suitable, for example in the range 0.02 to 0.5 mm.

Figure 3:
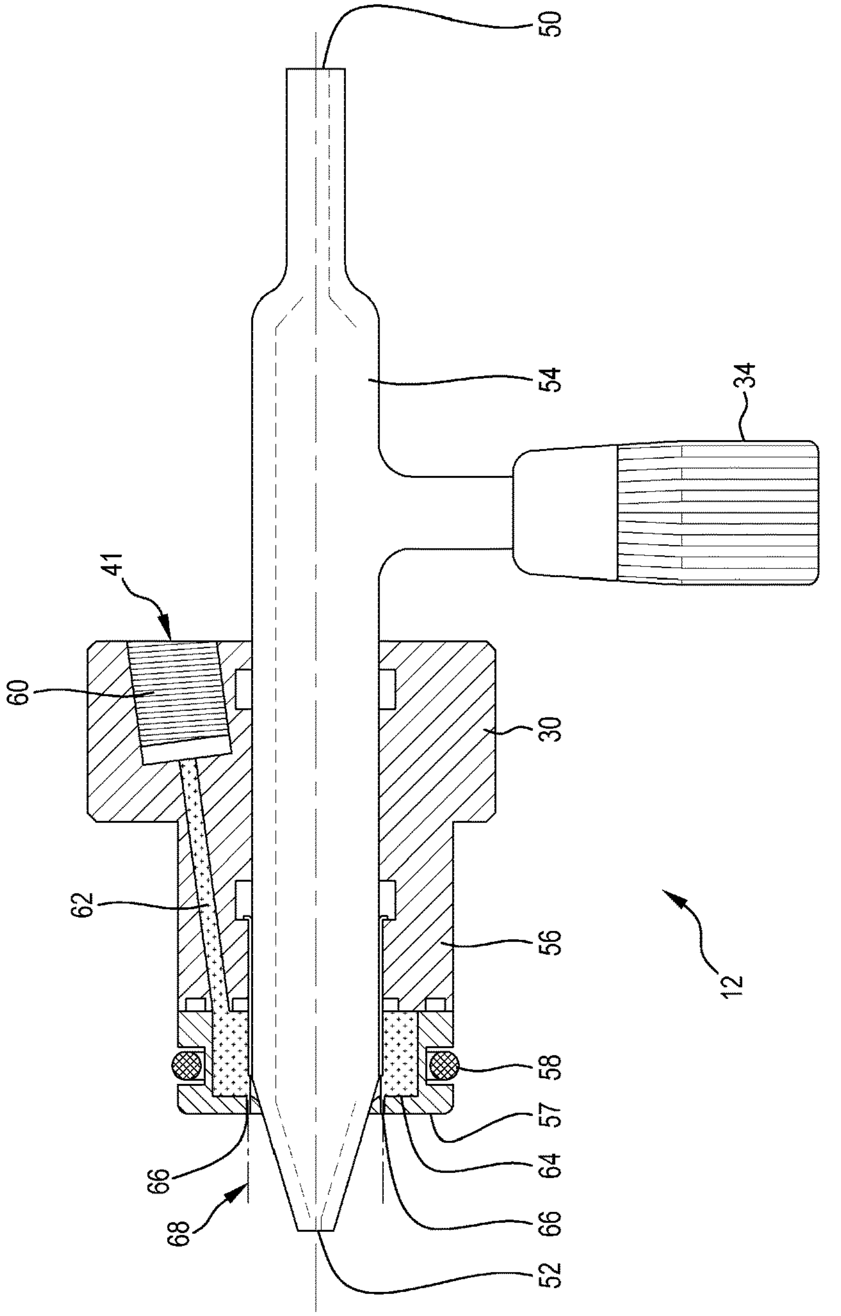
FIG. 3 is an end view of the nebuliser assembly of FIG. 2.
Figure 7:
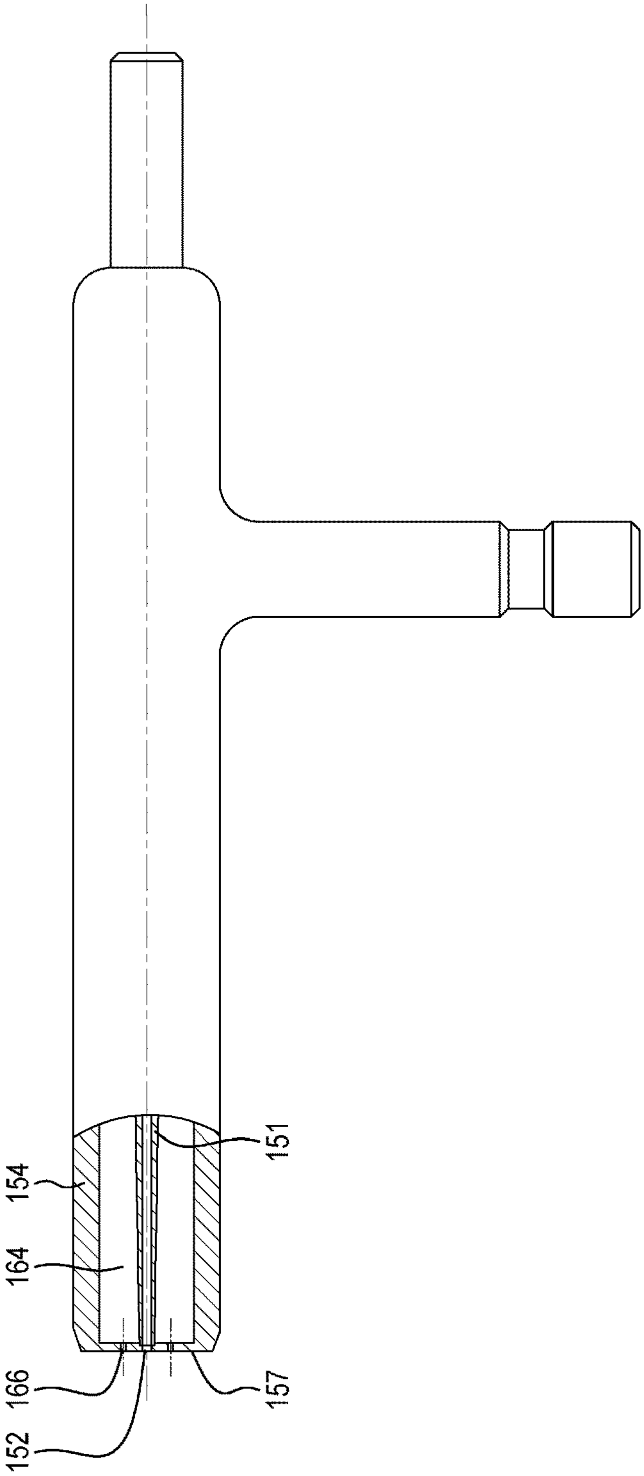
FIG. 7 is a side view of an alternative nebuliser assembly in accordance with an embodiment of the invention.
Figure 8:
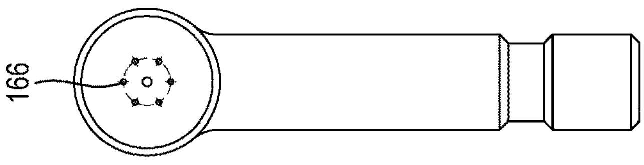
FIG. 8 is an end view of the nebuliser assembly of FIG. 7.

The embodiment described and illustrated above comprises an adaptor assembly 30 used to modify a conventional nebuliser to produce the desired microjets of make-up gas. Alternatively, the invention can be realised in an integrated nebuliser construction, as illustrated in FIGS. 7 and 8. In this embodiment, an outer tubular body 154 terminating in a transverse downstream face 157 surrounds a tapering inner tubular body 151, which terminates in central nebuliser flow nozzle 152 in face 157. The space formed between bodies 151 and 154 provides a make-up gas chamber 164. Around nebuliser nozzle 152 are arranged six bores 166 through transverse face 157, to provide microchannels connecting chamber 164 with gas microjet outlets (see FIG. 8). The device works in a similar way to that described above with reference to FIGS. 1-3, with a source of pressured make-up gas connected to chamber 164.

It will be understood that the invention disclosed and defined in this specification extends to all alternative combinations of two or more of the individual features mentioned or evident from the text or drawings. All of these different combinations constitute various alternative aspects of the invention.

By way of clarification and for avoidance of doubt, as used herein and except where the context requires otherwise, the term "comprise" and variations of the term, such as "comprising", "comprises" and "comprised", are not intended to exclude further additions, components, integers or steps.

The invention claimed is:

1. An analytic nebulizer device for delivering a sample in aerosolized form, the device comprising:

a nebulizer nozzle configured to receive a flow of said sample and generate a plume of aerosolized sample spray; and a chamber configured to receive a flow of make-up gas and fluidly coupled to a plurality of microchannels, wherein each of the microchannels comprises a microjet outlet, and wherein the microjet outlets are arranged around said nebulizer nozzle and are arranged substantially in a common plane;

wherein the nebulizer nozzle comprises a central axis and a nebulizer nozzle outlet;

wherein the nebulizer nozzle outlet is positioned within 5 mm of the common plane; and wherein the microjet outlets are configured to direct said make-up gas stream substantially parallel to said central axis and to produce a make-up gas stream with high linear velocity around said aerosolized sample spray to shape and direct said plume.

2. The device of claim 1, wherein the chamber and microchannels are arranged and connected such that the make-up gas stream is controllable separately to the flow of said sample.

3. The device of claim 1, wherein the microjet outlets are angled relative to said central axis to increase the swirl of the make-up gas, to direct the make-up gas stream into the aerosol plume to increase mixing of the two, or a combination thereof.

4. The device of claim 1, wherein the plurality of microchannels comprise 3 to 10 microchannels.

5. The device of claim 1, wherein the microjet outlets are evenly angularly spaced around the nebulizer nozzle and equidistant from said central axis.

6. The device of claim 5, wherein the distance of the microjet outlets from the central axis is 2-12 mm.

7. The device of claim 1, wherein the microjet outlets are 0.02 to 0.5 mm in diameter.

8. The device of claim 7, wherein the microjet outlets are 0.02 to 0.05 mm in dimension.

9. The device of claim 1, further comprising an adaptor and an inlet connectable with a source of make-up gas, wherein said chamber and said microchannels are provided in the adaptor, the adaptor configured to attach around a nebulizer body and position the microjet outlets around and adjacent to said nebulizer nozzle.

10. The device of claim 9, wherein the adaptor comprises an outer portion configured to support and engage with a spray chamber.

11. The device of claim 1, further comprising a nebulizer comprising the nebulizer nozzle, and wherein said chamber and said microchannels are integrated into the nebulizer.

12. A mass spectrometry or spectroscopy system, comprising an ionization device and an analytic nebulizer device according to claim 1, and configured to provide during operation the aerosolized sample spray to the ionization device.

13. The device of claim 1, wherein the microjet outlets are arranged in a single circle around the nebulizer nozzle.

14. The device of claim 1, further comprising a nebulizing gas inlet in fluid communication with the nebulizing nozzle and configured to combine said sample with a nebulizing gas prior to generating a plume of aerosolized sample spray.

* * * * *